US012712305B2

(12) United States Patent
Tronel et al.

(10) Patent No.: US 12,712,305 B2
(45) Date of Patent: Aug. 18, 2026

(54) PISTON ASSEMBLY AND SPRING-LOADED CONTACT

(71) Applicant: PRECI-DIP SA, Delémont (CH)

(72) Inventors: Tanguy Tronel, Neuchâtel (CH); Didier Guelat, Bure (CH)

(73) Assignee: PRECI-DIP SA, Delémont (CH)

( * ) Notice: Subject to any disclaimer, the term of this patent is extended or adjusted under 35 U.S.C. 154(b) by 307 days.

(21) Appl. No.: 18/555,860

(22) PCT Filed: Apr. 14, 2022

(86) PCT No.: PCT/EP2022/060137
§ 371 (c)(1),
(2) Date: Oct. 17, 2023

(87) PCT Pub. No.: WO2022/223474
PCT Pub. Date: Oct. 27, 2022

(65) Prior Publication Data

US 2024/0213701 A1 Jun. 27, 2024

Related U.S. Application Data

(60) Provisional application No. 63/282,674, filed on Nov. 23, 2021.

(30) Foreign Application Priority Data

Apr. 20, 2021 (EP) .................................... 21169349

(51) Int. Cl.
*H01R 13/24* (2006.01)

(52) U.S. Cl.
CPC ................................ *H01R 13/2421* (2013.01)

(58) Field of Classification Search
CPC ............................ H01R 13/08; H01R 13/2421
See application file for complete search history.

(56) References Cited

U.S. PATENT DOCUMENTS

| | | | | |
|---|---|---|---|---|
| 7,544,093 B2 | 6/2009 | Soubh et al. | | |
| 2012/0214346 A1* | 8/2012 | Leroyer | ............. | H01R 13/2421 439/625 |

FOREIGN PATENT DOCUMENTS

| | | | | |
|---|---|---|---|---|
| EP | 0838878 A1 * | 4/1998 | ......... | H01R 13/2421 |
| EP | 3764476 A1 * | 1/2021 | ......... | H01R 13/2421 |
| WO | 2022223474 A1 | 10/2022 | | |

OTHER PUBLICATIONS

English translation of EP-0838878-A1 (Year: 1998).*
Foreign Communication from a Related Counterpart Application, International Search Report and Written Opinion dated Jul. 12, 2022, International Application No. PCT/EP2022/060137 filed on Apr. 14, 2022.
Foreign Communication from a Related Counterpart Application, Extended European Search Report and Written Opinion dated Sep. 28, 2021, European Application No. 21169349 filed on Oct. 26, 2022.

* cited by examiner

*Primary Examiner* — Sean Gugger
(74) *Attorney, Agent, or Firm* — Conley Rose, P.C.

(57) ABSTRACT

A piston assembly for a spring-loaded contact, including: a piston body to be received into a housing of the spring loaded contact and having a first end to be connected directly or indirectly with an external part,
a clip to mate with a conductive portion of the spring-loaded contact, wherein the piston body has a through hole, the clip being in the through hole.

16 Claims, 4 Drawing Sheets

PISTON ASSEMBLY AND SPRING-LOADED CONTACT

CROSS-REFERENCE TO RELATED APPLICATIONS

The present application is a filing under 35 U.S.C. 371 as the National Stage of International Application No. PCT/EP2022/060137, filed Apr. 14, 2022, entitled "PISTON ASSEMBLY AND SPRING-LOADED CONTACT," which claims priority to U.S. Provisional Patent Application No. 63/282,674 filed with the United States Patent and Trademark Office on Nov. 23, 2021 and entitled "PISTON ASSEMBLY AND SPRING-LOADED CONTACT," and also claims priority to European Application No. 21169349.4 filed with the Intellectual Property Office of Europe on Apr. 20, 2021, all of which are incorporated herein by reference in their entirety for all purposes.

The present invention relates to a piston assembly and a spring-loaded contact.

In a spring-loaded connector having a tubular housing hosting a spring-loaded piston with a clip accommodated therein with a plurality of beams, it would be conceived that the clip is inserted into the tubular housing by pushing the beams of the clip. However, this process may damage the beams and reduce a reliability of the connector.

In addition, providing a piston assembly to allow insertion of the clip by pushing it via an end face opposite to the beams may require increased wall thickness to achieve the required press fit resistance. Such an increase of thickness leads to an increase of the pitch in a plug having several spring-loaded connectors.

An object of the disclosure is to provide a reliable compact piston assembly and a spring-loaded contact including the same.

The present disclosure further concerns a piston assembly for a spring-loaded contact, including:

- a piston body to be received into a housing of the spring-loaded contact and having a first end to be connected directly or indirectly with an external part,
- a clip to mate with a conductive portion of the spring-loaded contact,
  - wherein the piston body has a through hole, the clip being in the through hole.

According to the above structure, as the piston assembly is made of separate parts (a piston body and a clip) and the piston body includes a through hole, the clip can be inserted into the through hole of the piston body through the first end, so that clip may not be damaged during assembling. In addition, the piston assembly may ensure a reliable contact with the conductive portion.

Advantageously, the piston body has a length representing 65% to 100% of the length of the piston assembly, preferably 75% to 100%, more preferably 85 to 100%, most preferably 90 to 100%. This feature contributes to reducing a length or a height of the spring-loaded contact.

Advantageously, the first end has a contacting surface to contact an external part directly. Consequently, no protruding cap may be provided to the piston assembly and the length of the piston body may represent 90% of the length of the piston assembly in the case the clip protrudes from the piston body to 100% in the case the clip is fully embedded in the piston body. Such a piston assembly shows a very limited length or height.

Advantageously, the piston assembly may have a cap or seal at least partially received in the through holes and closing the first end. Such an embodiment is relevant in the case of water or dust-proof application, to avoid water or dust from reaching the through hole. For example, the cap may be fully embedded in the piston body or may slightly protrude from the first end of the second body. Preferably, the cap has a length representing 20% or less, preferably 15% or less, again preferably 10% or less and most preferably 10 or 5% or less of the length of the piston assembly.

Advantageously, the piston body has a second end opposite the first end and wherein the clip protrudes partially from the second end. Preferably, the clip has a length representing 20% or less, preferably 15% or less, again preferably 10% or less and most preferably 10 or 5% or less of the length of the piston assembly. Such a protruding clip may enhance the electrical conduction and reduce the electrical disconnections in case of shocks or vibrations.

Advantageously, the clip is press-fitted in the through hole which allows a simple assembling method and a reliable fixing of the clip.

Advantageously, the clip includes:

- a clipping portion arranged to mate with the conductive portion of the spring-loaded contact,
- a base end, opposite to the clipping portion,
- wherein the base end is located in the through hole, on the side of the first end of the piston body.

According to this structure, damages to the flexible contacting end or clipping portion may be prevented when pushing the base end to insert the clip into the through hole of the piston body.

Advantageously, the clipping portion extends from the base end in a direction opposite to the first end of the piston body. This allows to produce a more reliable and easier to assemble piston assembly. The clipping portion may have beams possibly flexed inwardly, i.e., toward a center of the though hole.

Advantageously, the base end has a clip wall arranged to withstand a press fit force applied to the clip to insert the clip into the through hole. This may contribute to an easier assembling of the piston assembly while preventing damages to the clip.

Advantageously, the clip defines a through cavity i.e., is hollow and has two opposite and open ends. Such a clip may be cheaper and easier to handle during the assembling process.

Advantageously, the piston body includes a piston groove to accommodate at least part of a coil spring of the spring-loaded contact. This may allow to use a longer coil spring, thus ensuring a reliable current transmission despite shocks and vibrations. The piston groove may be open in the direction of the second end and/or opposite to the first end of the piston body.

The present disclosure further concerns a piston assembly for a spring-loaded contact, including:

- a piston body to be received into a housing of the spring-loaded contact and having a contacting surface to contact an external part,
- a clip to mate with a conductive portion of the spring-loaded contact,
  - wherein the piston body has a through hole, the clip being in the through hole.

This piston assembly may include any advantageous feature described above.

The present disclosure further concerns a spring-loaded contact, including:

- one of the piston assemblies described above,
- a conductive portion, and
- a housing.

Such a spring-loaded contact may transmit an electrical current with no or few disconnections despite shocks and vibrations and is easy to manufacture and to assemble.

Advantageously, the conductive portion includes a pin portion for mating with the clip. For example, the pin portion is received partially in the clip, in a resting position of the piston assembly, i.e., when no external pressure is applied on the piston assembly. For example, the pin is introduced in the clip and in the through hole through the second end of the piston body. The pin portion and the piston assembly may be preferably configured so that the pin portion always contact the clip, whatever the position of the piston assembly.

Advantageously, the pin portion and the piston assembly are configured so that the pin portion is mainly or fully located in the piston assembly in a compressing position of the spring-loaded contact. This allows to prevent any damage to the external part that may be fixed to the piston assembly. For example, the pin portion does not protrude from the first end of the piston assembly, even in a compressing position of the piston assembly.

Advantageously, the conductive portion includes a base portion for connecting another external part such as an electronic or electric circuit. The base portion may be fixed at least partially within the housing. For example, when the base portion is connected to the other external part, an electrical current may be transmitted from the external part to the other external part.

Advantageously, the base portion has a base groove to accommodate at least part of the coil spring of the spring-loaded contact. This may allow to use a longer coil spring, thus reducing or canceling electrical disconnections despite shocks and vibrations.

Advantageously, a coil spring is located between the base portion and the piston body. The coil spring may maintain the piston assembly in a resting position, i.e., at one extremity of the housing opposite to the base portion of the conductive portion.

Advantageously, the housing includes an external bulge or rib. Such an external bulge allows to manipulate the housing and simplifies the assembling process of the spring-loaded contact.

The present disclosure further concerns a piston assembly for a spring-loaded contact, including:

- a piston body to be received into a housing of the spring-loaded contact and having a contacting surface to contact an external part,
- a clip to mate with a conductive portion of the spring-loaded contact,
  - wherein the piston body and the clip define a pass-through receiving section for the conductive portion.

This piston assembly may also have any of the advantageous features disclosed above. This piston assembly has no cap which allows to reduce the length or the height of the piston assembly.

The present disclosure further concerns a spring-loaded contact, including:

- a housing,
- a piston assembly protruding from the housing, the piston assembly including:
  - a piston body to be received into a housing of the spring-loaded contact and having a contacting surface to contact an external part,
  - a clip to mate with a conductive portion of the spring-loaded contact,
  - wherein the piston body has a through hole, the clip being in the through hole.

The spring-loaded contact may have no protruding cap which allows to reduce the length or the height of the spring-loaded contact.

The present disclosure finally concerns a method to manufacture a piston assembly, the method comprising:

- providing a piston body having a through hole and a contacting surface
- providing a clip having a clip portion and a base end opposite to the clip portion
- positioning the clip in front of the piston body so that the clip portion extends toward the through hole of the piston body
- inserting the clip into the through hole of the piston body by pressing an end face of the base end of the clip.

This method allows to efficiently manufacture a piston assembly. The piston assembly may be as described above.

Other features and advantages of the present invention will appear more clearly from the following detailed description of particular non-limiting examples of the invention, illustrated by the appended drawings where:

It is, of course, understood that improvements, alternatives and/or modifications obvious for one skilled in the art may be implemented, still being under the scope of the invention as it is defined by the appended claims.

Figure 1:
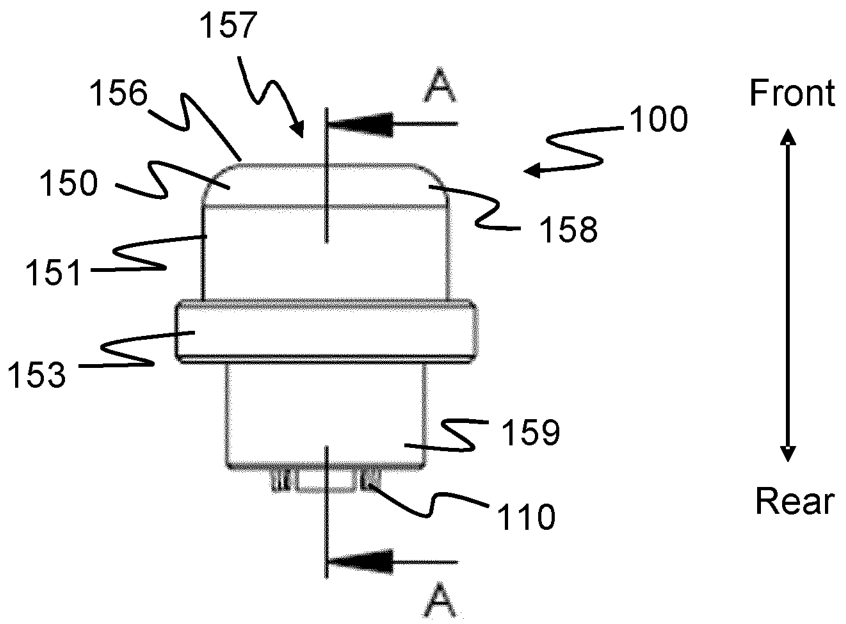
FIG. 1 represents a side view of a piston assembly.
Figure 2:
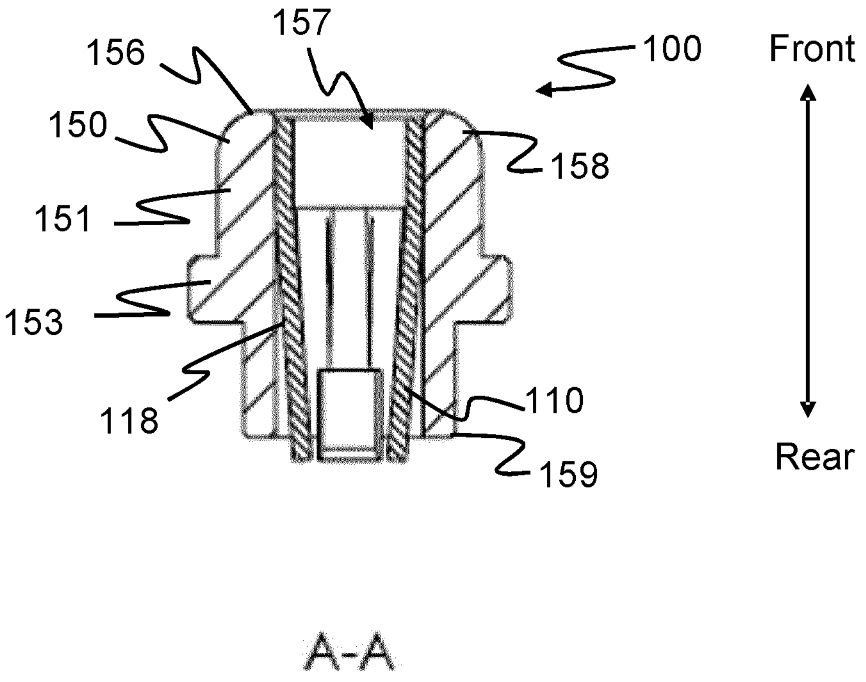
FIG. 2 represents a cross-sectional side view of the piston assembly of FIG. 1 on the plane A-A.

With reference to FIGS. 1 and 2, a piston assembly 100 may have a piston body 150. The clip 110 is inserted inside the piston body 150. The piston body 150 may be provided with a tubular wall 151 having a through hole 157 and a flange 153 formed on the outer surface of the tubular wall 151. The flange 153 may have a greater diameter than the diameter of the tubular wall 151.

In the embodiment of FIG. 1, the tubular wall 151 has a greater diameter in a front portion (or upper portion) and a smaller diameter in a rear portion (or bottom portion). Alternatively, the tubular wall may have a constant diameter at both sides of the flange 153. In addition, the optional flange 153 may be replaced by a groove or by attaching means such as protrusions extending perpendicularly from the longitudinal axis of the piston body 150.

A contacting surface 156 may be provided, for example around the through hole 157 and/or on a front-end portion of the piston body 150. The contacting surface 156 may allow to contact an external part, for example an electric or electronic circuit. The contacting surface 156 may have a curved surface, as visible in FIGS. 1-3 or alternatively a flat surface.

Figure 3:
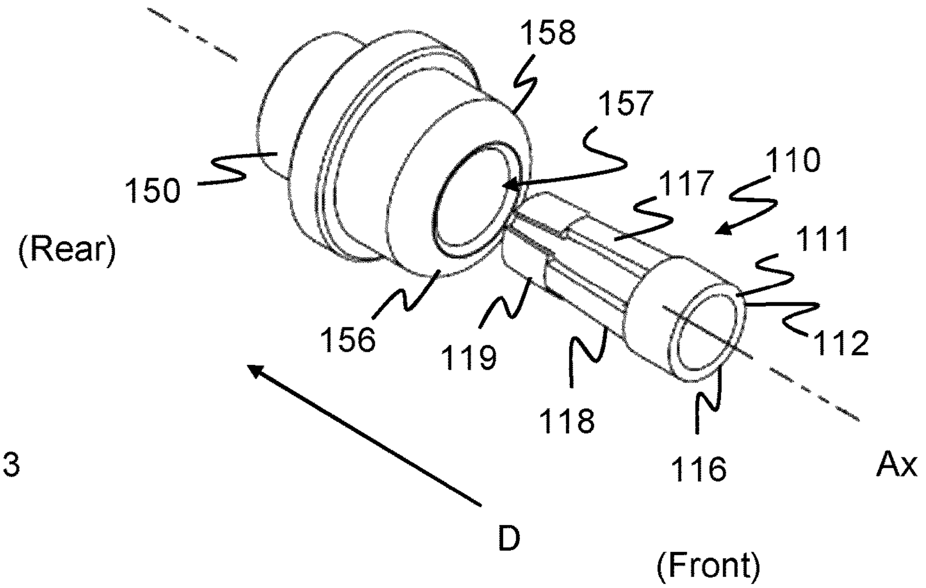
FIG. 3 represents a perspective view of a piston body and a clip of the piston assembly of FIGS. 1 and 2.

The front surface or front extremity of the piston body 150 may be a first end 158 of the piston body and the rear surface or rear extremity of the piston body 150 may be a second end 159 of the piston body 150. In FIGS. 1-3, no cap is provided in the through hole 157 and only the clip 110 may slightly protrude from the second end 159 of the piston body 150.

The length of the piston body 150 (i.e., the dimension of the piston body on the longitudinal axis of the piston body 150) may thus be 94, 96 or 97% of the length of the piston assembly 100.

Referring to FIG. 3, the clip 110 may have a base end 111 for example in the form of a clip wall 112, optionally tubular, and a clipping portion 117 positioned opposite to the contacting surface 156. The base end 111 may be provided with an end face 116. The base end 111 may have an outer diameter substantially identical to the inner diameter of the through hole 157 so that the clip 110 can be pushed and inserted into the through hole 157 (press fit assembly).

The clipping portion 117 may comprise a plurality of flexible beams 118 in a form of cantilever extending from the base end 111, for example four beams as visible in FIG. 3 or alternatively, two, three or five beams. For a person skilled in the art, it is understood that a different number of beams 118 can be used as long as they can hold a part of a conductive portion in any position of the clip 110.

Each beam 118 may be slightly bent radially inwardly and/or the diameter of the clipping portion 117 may become smaller toward the tip end. Finally, each beam 118 may have a tab 119 in an end portion of the beam 118, the tab may have a width greater than a final width or any width of the beam 118, as visible in FIG. 3. The tabs 119 may reduce or cancel any hanging of the clips 110 before assembling the clips 110 in the piston bodies 150.

The clip 110 may be inserted into the through hole 157 of the piston body 150, preferably through the first end 158 and along a front-to-rear direction or direction D in FIG. 3, for example along a longitudinal axis Ax of the piston body 150 and/or the clip 110. The clip 110 may thus be fixed in the through hole 157, preferably by press-fitting. Alternatively, ultrasonic welding may be considered.

The advantage of inserting the clip 110 in this direction is that the beams 118 of the clip 110 may contact a conductive portion of the spring-loaded contact deeper into the spring-loaded contact 200, thus providing a reliable contact in a shorter height (a length along the front-rear direction in the drawings). In addition, inserting and pushing the clip 110 from the side opposite to the conductive portion of the spring-loaded contact 200 provides the ability to push on the end face 116, avoiding any stress on the beams 118.

In FIGS. 1-7, the clip 110 may be open at both the rear ends, to receive a conductive portion, and at the front end, which may allow the clip 110 to be transported and handled more easily. In addition, an open front end may simplify the manufacturing of the clip 110. For example, the clip 110 may be obtained by cutting and rolling a flat sheet of metal.

Alternatively, the front-end portion of the clip may be closed by a clip closing portion (not shown), which may increase the surface area of the contacting surface 156 or at least prevent any ingress of liquid or dust in the clip 110.

The reverse insertion of the pin (i.e., in the rear direction or direction D) has been made possible by the assembly construction. If the piston body 150 has no through hole 157, the clip 110 cannot be inserted without damaging the beams 118. The present embodiment allows an assembling method involving a step of pushing on the base end 111 (i.e., the end face 116) of the clip 110.

The piston body 150 can be typically machined from brass, phosphor-bronze, beryllium-copper, other copper alloy or other conductive metals/alloys, including nickel-silver alloys. The clip 110 can be manufactured from a copper alloy, typically beryllium-copper, beryllium-nickel or other high strength conductive copper alloy. The parts are typically post-plated with any one of a variety of coatings, typically a gold plating and/or silver plating, for the purpose of enhancing electrical contact and improving wear and corrosion resistance of the piston assembly 100.

Figure 4:
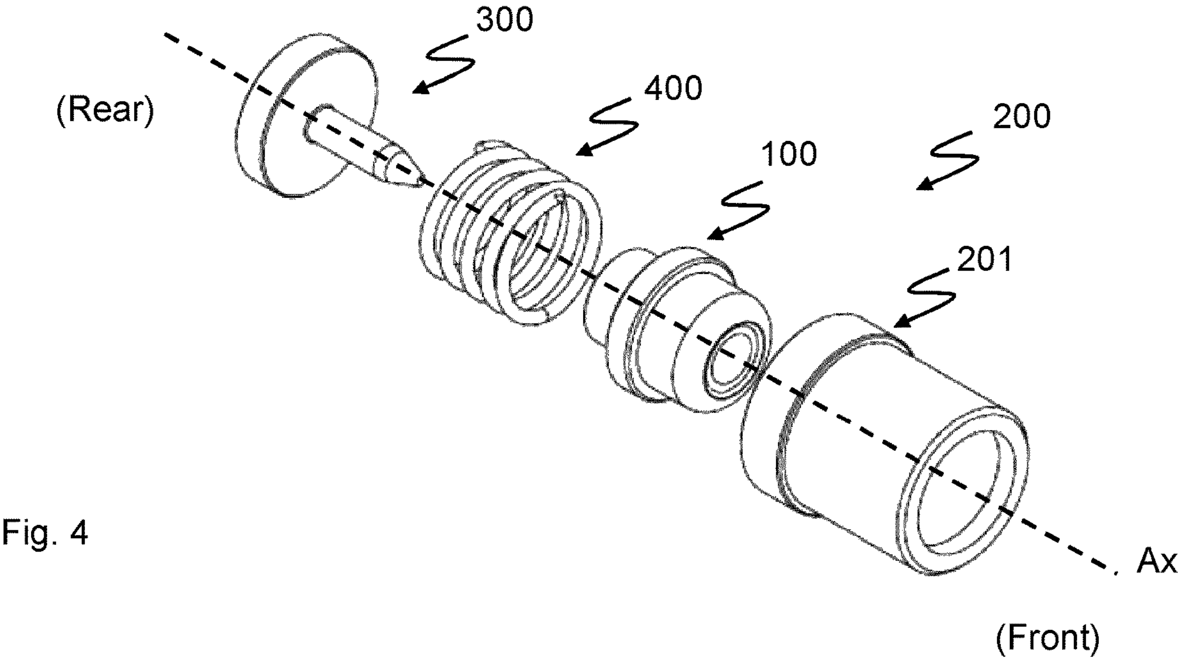
FIG. 4 represents an exploded view of a spring-loaded contact including the piston assembly of FIGS. 1 to 3.
Figure 5:
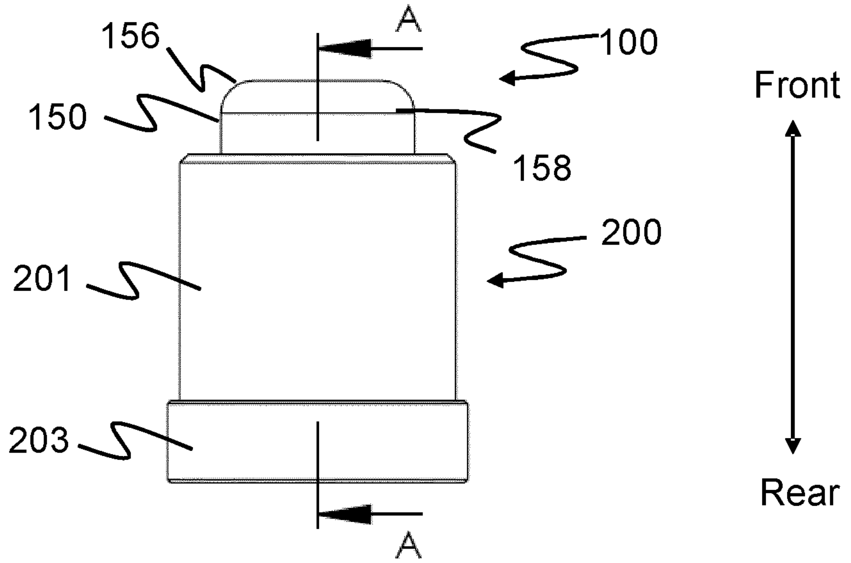
FIG. 5 represents a side view of the spring-loaded contact of FIG. 4.
Figure 6:
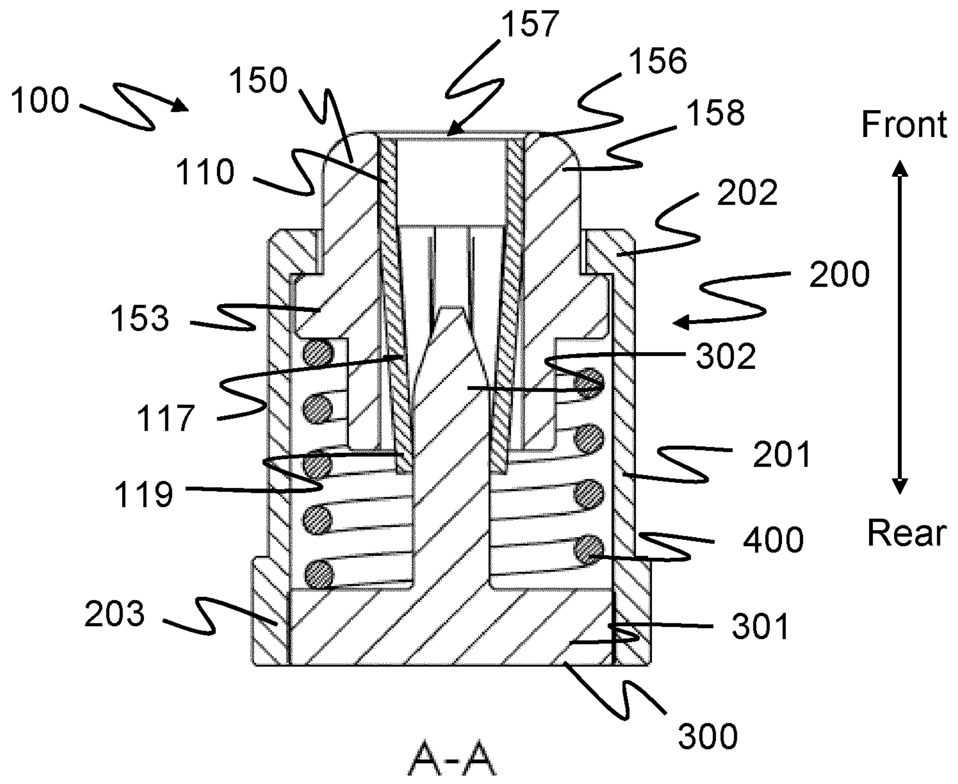
FIG. 6 represents a cross-section side view of the spring-loaded contact of FIGS. 4 and 5.

Now with reference to FIGS. 4 to 6, the spring-loaded contact 200 has a guiding cylinder or housing 201 and the piston assembly 100 may be accommodated in the housing 201. The housing 201, piston body 150 and clip 110 may be designed to align concentrically with each other, i.e. along a longitudinal axis Ax of the piston assembly 100 and of the spring-loaded contact 200.

The piston assembly 100 is configured to be movable along the longitudinal axis Ax of the housing 201 and of the spring-loaded contact 200. In the housing 201, a coil spring 400 and a conductive rod 300, as an example of a conductive portion, may be provided, the configurations and functions of which will be described later. The housing 201 may thus guide a movement of the piston assembly 100 with regard to the conductive rod 300 and protect the interface between the conductive rod 300 and the clip 110.

FIG. 6 shows the piston assembly 100 disposed in the housing 201 such that the flange 153 is positioned within the housing 201 and a front part of the piston assembly 100, in particular the first end 158, is protruding from an end wall 202 of the housing 201. The flange 153 may be pushed by way of the coil spring 400 so that the flange 153 abuts inside the end wall 202 in a resting position, for example in a direction opposite to the direction D, i.e., in the front direction in FIGS. 4 and 5. The piston assembly 100 can be pushed into the housing 201 (i.e., in the rear direction or in direction D) to compress the coil spring 400 when it contacts an external component and/or when it is submitted to pressure in the rear direction.

The clipping portion 117 of the clip 110 can hold at least a part of the conductive rod 300 which may form or include a conductive portion. The clip 110 and the piston body 150 may thus define a receiving section for the conductive portion. The receiving section may be open at both ends to define a pass-through receiving section or may be closed by a cap, as presented later. The conductive rod 300 may have a base end 301 and a pin portion 302 extending vertically from the inner surface of the base end 301. The clipping portion 117 is configured to contact a contacting area of the pin portion 302. A front extremity of the pin portion 302 may be beveled, conical or sharp in order to facilitate an insertion of the clip 110 on the pin portion 302, for example without any damage to the beams 118.

The contacting area of the pin portion 302 can form 50% the length of the pin portion 302 or less, 40% or less of this length or 30% of this length and preferably at least 20%, in a resting position of the spring-loaded contact 200 shown in FIGS. 1-6. The length of the contacting area may depend on the length of the stroke of the piston assembly 100.

In the embodiment of FIG. 6, the circular base end 301 can be mechanically fixed to the inside of the housing 201 (by press fit assembly, or ultrasonic welding).

Preferably, the total length of the pin portion 302 is chosen so that the pin portion 302 does not protrude out of the piston assembly 100 in a compressed position, when the coil spring 400 is in a maximum compression state and/or has its shortest length. For example, the length of the pin portion 302 may be equal to or smaller than the length of the pin 110 or of the through hole 157.

The housing 201 may have an external bulge or circumferential rib 203 in order to simplify manipulation of the housing before and during the assembling process of the spring-loaded contact 200.

Figure 7:
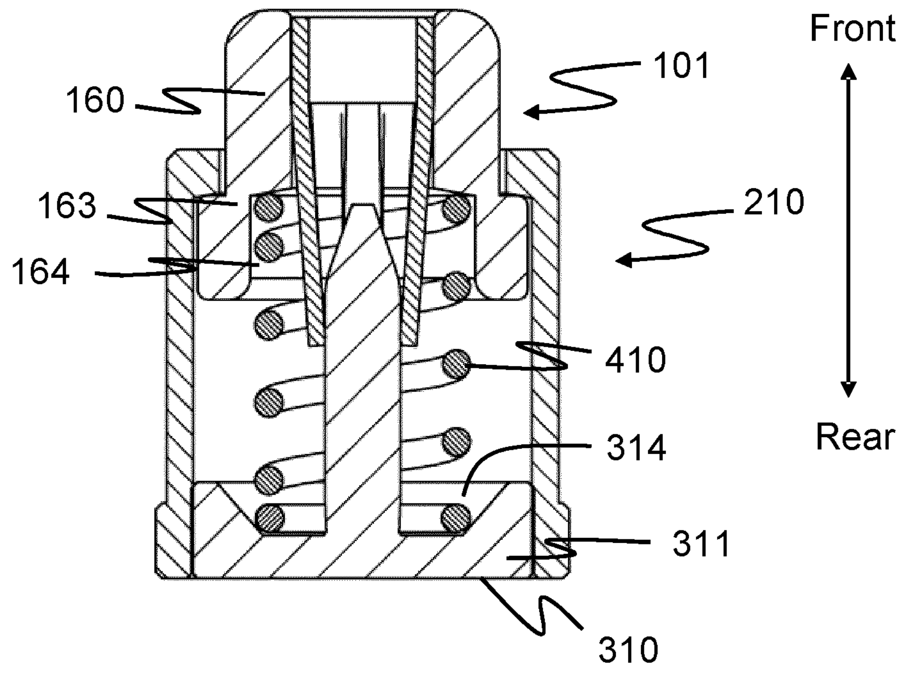
FIG. 7 represents a side view of another spring-loaded contact.

FIG. 7 shows another spring-loaded contact 210 according to the present invention. This spring-loaded contact 210 is similar to the spring-loaded contact 200 described with reference to FIGS. 1-6 with the exception of the piston body 160 and of the conductive rod 310.

The flange 163 of the piston body 160 may include a piston groove 164 open toward the rear direction and configured to receive a front extremity of the coil spring 410. The base end 310 may include a base groove 314 open toward the front direction and configured to receive a rear extremity of the coil spring 410. The piston groove 164 and the base groove 314 allow to use a longer coil spring 410, which may provide a better resistance to shock and vibrations to the spring-loaded contact 210. Circumferential portions of the base end 310 and/or of the flange 163, for example nearby the base groove 314 and the piston groove 164 may also acts as stopping portions to prevent any contact between the clip 110 and the base end 311.

Figure 8:
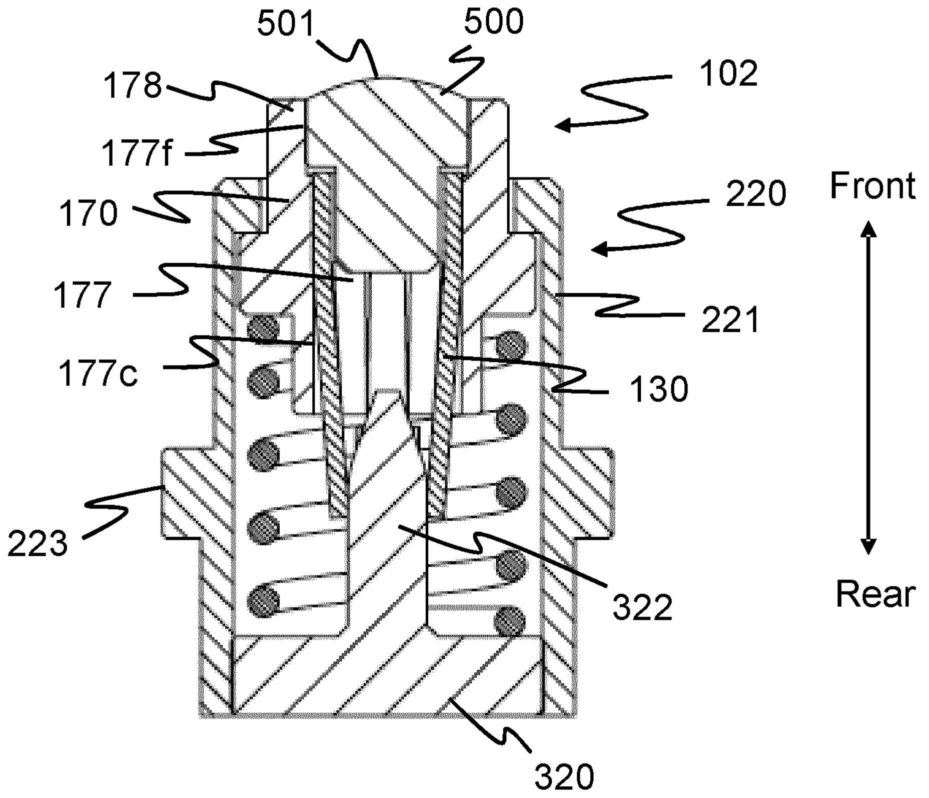
FIG. 8 represent a side view of another spring-loaded contact including a protruding cap.

FIG. 8 represents another spring-loaded contact 220, identical to the spring-loaded contact 200 with the following differences in the piston assembly 102. The through hole 177 may include a front portion **177*f* having a diameter larger than a core portion 177*c*. The clip 130 is located in the core portion 177*c*, as previously described. A cap 500 is introduced in the front portion 177*f* to close the through hole 177 at the first end 178 of the piston assembly 102**.

The cap 500 may protrude from the first end 178 of the piston body 170 in FIG. 3 by a convex front surface 501. However, the front surface may also be flat or concave, which may allow to preserve a contacting surface of the piston body for a direct connection of the external part to the piston body (not shown).

The pin portion 322 of the conductive rod 320 may be shorter than the pin portion 301 of FIGS. 4 and 6. Alternatively or in combination, the clip 130 may be shorter than the clip 110 of FIGS. 1-3. In any case, the clip 130 must contact the pin portion 322 in any position of the piston body 170 without pushing the cap 500 out of the through hole 177.

While not being linked to the cap 500 and piston assembly 102, the housing 201 may include an external bulge or circumferential rib 223 located in a mid-portion of the external wall of the housing 221.

The cap 500 may be made of polymer such as Kapton (polyimide) or in metal, similarly to the clip 110 and the piston body 150, as described above. If a non-conducting polymer is used, the cap 500 preferably has a flat or a concave front surface to preserve the contacting surface 156 of the piston body 150.

Finally, regarding dimensions, the spring-loaded contact according to the present disclosure may have any dimension authorized by the specific external parts to be connected. For example, the clip 110, 130 may have a length of 1.0 to 2.0 mm, for example 1.5 or 1.3 mm. The total length of a spring-loaded contact 200, 210, 220 may be 1.9 to 4.1 mm, for example 2.0 to 3.1 mm and the largest diameter may be 1.6 to 2.2 mm, for example 1.8 or 1.9 mm. The largest diameter of the piston body 150, 170 may be 1.1 to 1.5 mm, for example 1.2 or 1.3 mm. The spring-loaded contact according to the present disclosure may transmit a current of 3 to 20 A, for example 6 to 15 A, with no or very few electrical disconnections.

The present disclosure does not limit the scope of the invention which may include any alternative or improvement available to the skilled person. In particular, the features of the above-described spring-loaded contacts may be interchanged. In addition, all the elements may have a circular symmetry around the longitudinal axis Ax. The different elements of the spring-loaded contact according to the present disclosure are not limited to a circular or cylindrical shape but may have any available shape such a square, rectangular or oval.

REFERENCE NUMERALS

100, 101, 102 piston assembly
110, 130 clip
111 base end
112 clip wall
116 end face
117 clipping portion
118 beam
119 tab
150, 160, 170 piston body
151 tubular wall
153, 163 flange
156 contacting surface
157, 177 through hole
**177*c*** core portion
**177*f*** front portion
158, 178 first end (front end)
159 second end (rear end)
164 piston groove
200, 210, 220 spring-loaded contact
201 housing
202 end wall
203, 223 circumferential rib
300, 310, 320 conductive rod
301, 311 base end
302, 322 pin portion
314 base groove
400, 410 coil spring
500 cap
501 front surface

The invention claimed is:

1. A piston assembly for a spring-loaded contact, including:

a piston body to be received into a housing of the spring-loaded contact and having a first end to be connected directly or indirectly with an external part, a clip to mate with a conductive portion of the spring-loaded contact, wherein the piston body has a through hole, the through hole extending longitudinally through the piston body and is configured to receive the clip wherein the clip includes:

a clipping portion arranged to mate with the conductive portion of the spring-loaded contact, a base end, opposite to the clipping portion, and wherein the base end is located in the through hole on the side of the first end of the piston body.

2. The piston assembly according to claim 1, wherein the piston body has a length representing 65% to 100% of the length of the piston assembly.

3. The piston assembly according to claim 1, wherein the first end has a contacting surface to contact the external part directly.

4. The piston assembly according to claim 3, having a cap at least partially received in the through hole and closing the first end.

5. The piston assembly according to claim 3, wherein the piston body has a second end opposite the first end and wherein the clip protrudes partially from the second end.

6. The piston assembly according to claim 1, wherein the clip is press-fitted in the through hole.

7. The piston assembly according to claim 1, wherein the clipping portion extends from the base end in a direction opposite to the first end of the piston body.

8. The piston assembly according to claim 1, wherein the base end has a clip wall arranged to withstand a press fit force applied to the clip to insert the clip into the through hole.

9. The piston assembly according to claim 1, wherein the clip defines a through cavity.

10. The piston assembly according to claim 1, wherein the piston body includes a piston groove to accommodate at least part of a coil spring of the spring-loaded contact.

11. The piston assembly according to claim 1, wherein the conductive portion includes a pin portion for mating with the clip.

12. The piston assembly according to claim 11, wherein the pin portion and the piston assembly are configured so that the pin portion does not protrude out of the piston assembly.

13. The piston assembly according to claim 1, wherein the conductive portion includes a base portion for connecting another external part, an electronic or electric circuit.

14. The piston assembly according to claim 13, further comprising a base portion has a base groove to accommodate at least part of a coil spring of the spring-loaded contact.

15. The piston assembly according to claim 14, wherein the coil spring is located between the base portion and the piston body.

16. The piston assembly according to claim 1, wherein the housing includes an external bulge.

* * * * *